May 24, 1938.  C. F. MEILINK  2,118,382
CASH DRAWER
Filed May 6, 1936  3 Sheets-Sheet 1
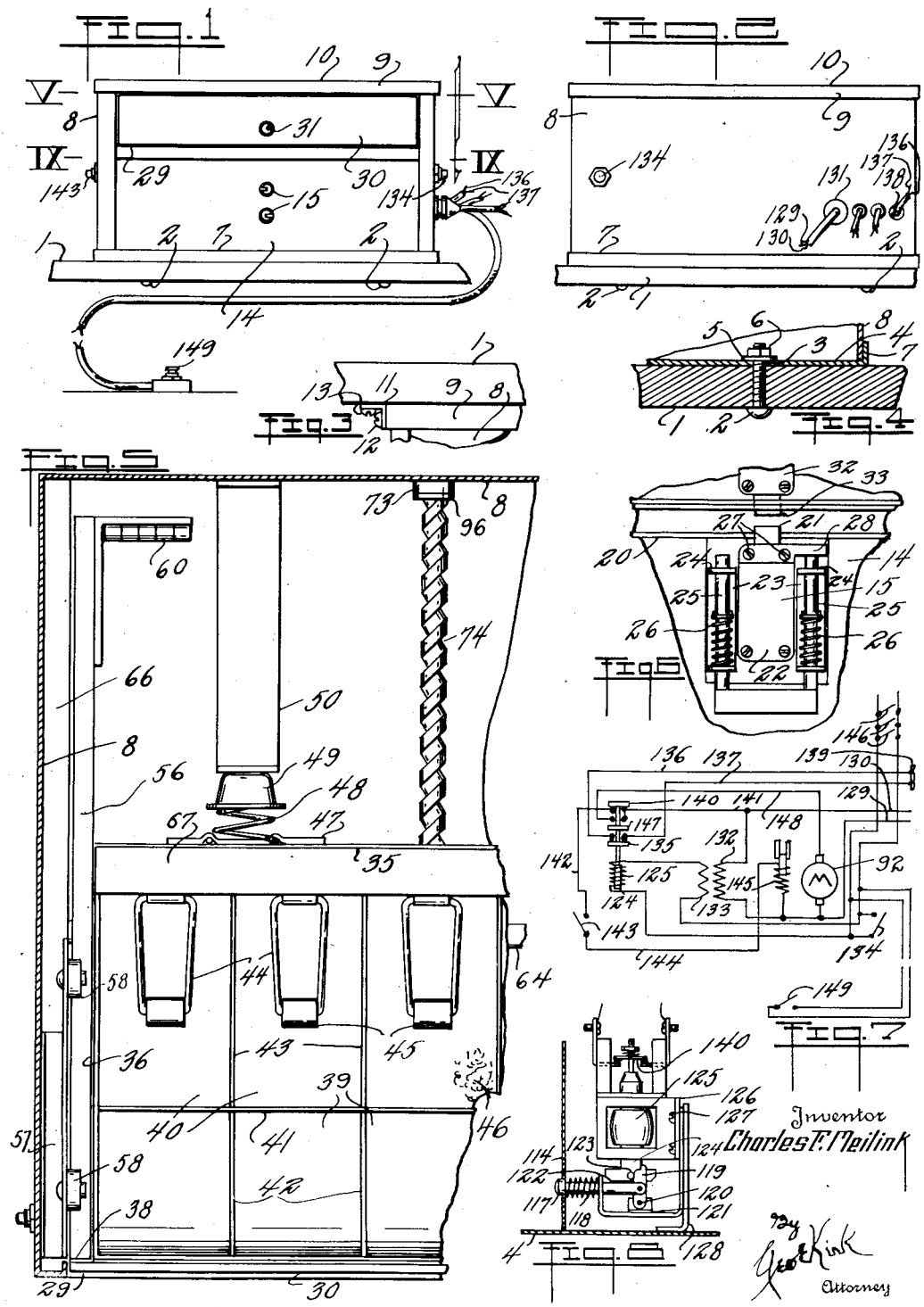

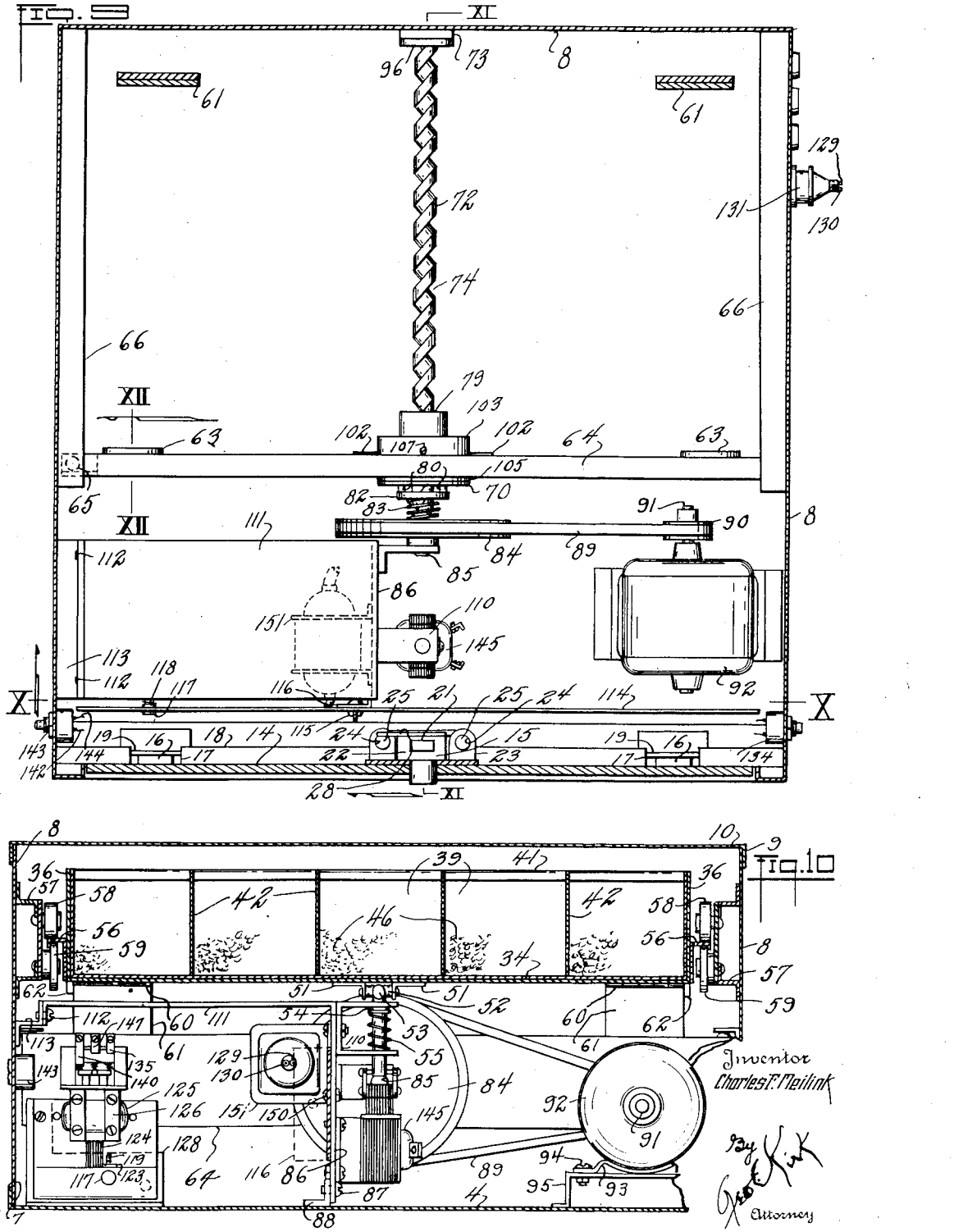

May 24, 1938.                C. F. MEILINK                2,118,382
                              CASH DRAWER
                           Filed May 6, 1936                3 Sheets-Sheet 3
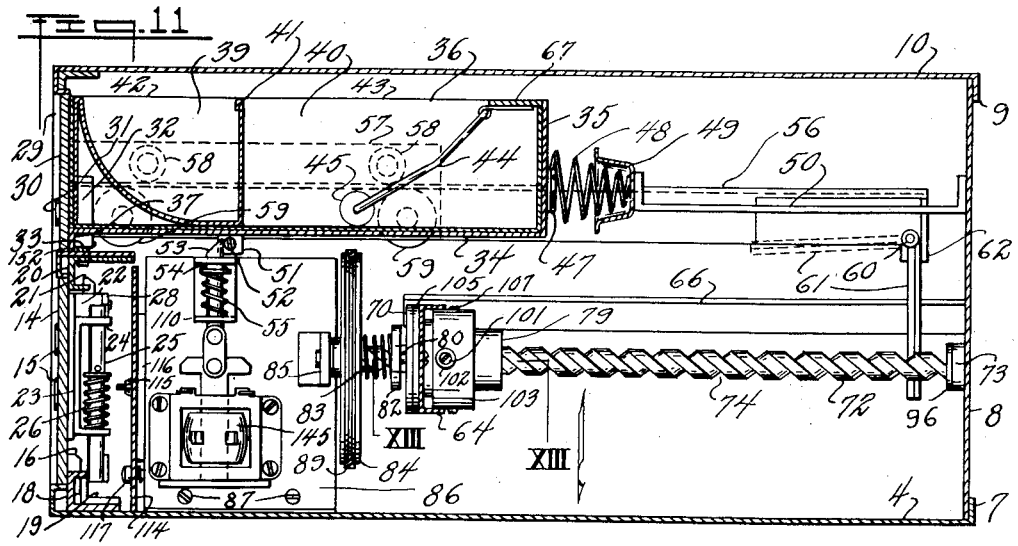
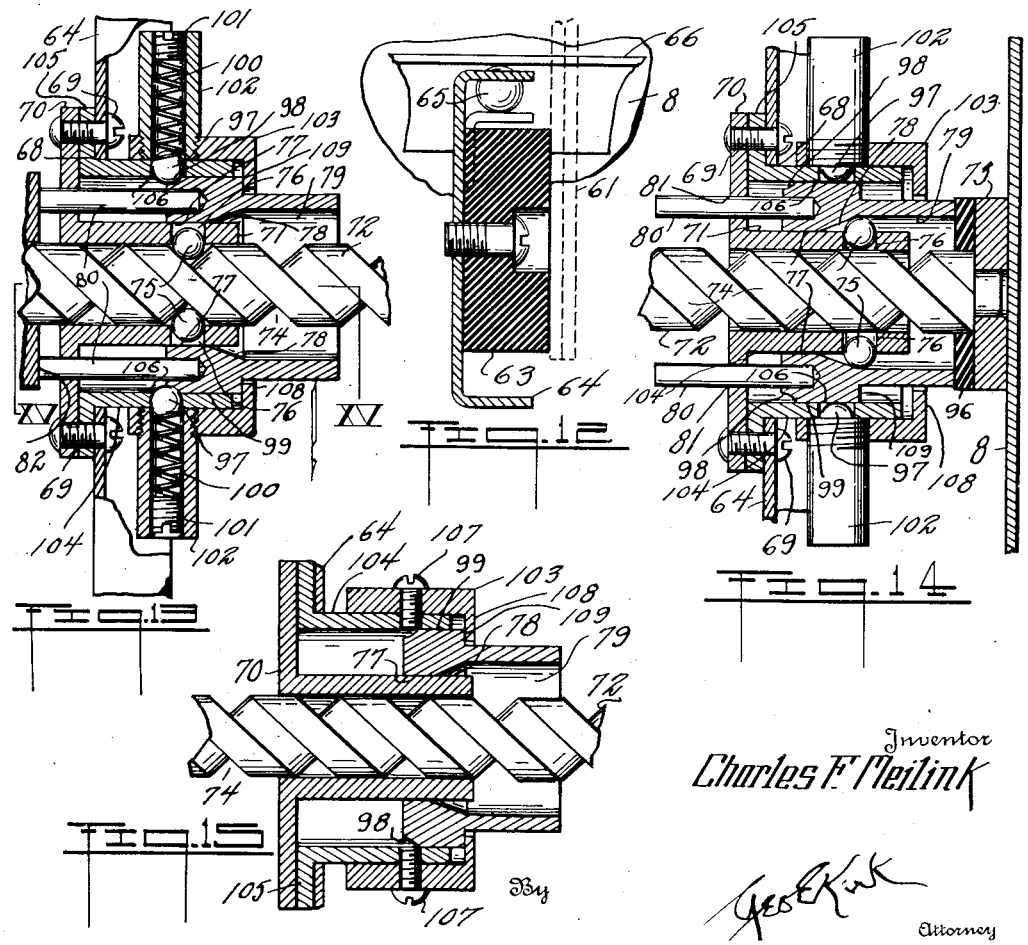
Inventor
Charles F. Meilink
By
Attorney Patented May 24, 1938

2,118,382

UNITED STATES PATENT OFFICE 2,118,382

CASH DRAWER

Charles F. Meilink, Toledo, Ohio

Application May 6, 1936, Serial No. 78,268

12 Claims. (Cl. 109—1)

This invention relates to features of control for protective receptacles.

This invention has utility when incorporated in cash drawers, more particularly as to features for selective opening and closing, emergency closing, and maintaining against re-opening.

Referring to the drawings:

Fig. 1 is a front view, with parts broken away, of an embodiment of the invention as a cash drawer installed on a counter, ledge or shelf;

Fig. 2 is a side elevation of the cash drawer assembly of Fig. 1;

Fig. 3 is a fragmentary view showing anchorage means for sub-shelf or sub-counter assembly of the drawer instead of over-counter, over-shelf assembly thereof;

Fig. 4 is a fragmentary view showing anchorage in over-counter or over-shelf assembly for the cash drawer of Fig. 1;

Fig. 5 is a fragmentary view on the line V—V, Fig. 1;

Fig. 6 is a detail view from the inside toward the front showing safeguarding means against forcible entry to the installation;

Fig. 7 is a wiring diagram of the features of electric control;

Fig. 8 is a view of the electrical controlling solenoid of the mechanism herein for breaking the drawer opening control circuit and closing the alarm circuit, whether the control be adjacent or remote;

Fig. 9 is a section on the line IX—IX, Fig. 1;

Fig. 10 is a section on the line X—X, Fig. 9;

Fig. 11 is a section on the line XI—XI, Fig. 9;

Fig. 12 is a section on the line XII—XII, Fig. 9;

Fig. 13 is a section on the line XIII—XIII, Fig. 11, showing the clutch device in driving or clutch connection;

Fig. 14 is a view similar to Fig. 13, showing the clutch device in unclutched position; and Fig. 15 is a section on the line XV—XV, Fig. 13.

Support or counter 1 (Fig. 4) is shown with bolts 2 rising therethrough and through openings 3 in bottom 4 of the device with washer 5 engaged by nut 6 in this fixed assembly of the installation having the bottom 4, with flanges 7 rising therefrom about side wall 8 (Fig. 1). Depending flanges 9 mount top portion 10 therewith. This housing unit 4, 8, 10, has weld assembly therebetween.

Should it be desired to locate this installation below instead of above the shelf or counter 1, angle 11 (Fig. 3) may have bolts 12 engage the flange 9 and riser wall 8, while the assembly with the counter or shelf 1 is by means of screw 13. This unit safety or protective receptacle having the bottom 4, top 10, and side walls 8, at its front portion has lower closure 14 with dual lock device 15 accessible say by station or store attendant and traveling auditor. This closure 14 has fixed therewith depending lugs 16 (Fig. 11) extending through eyes 17 (Fig. 9) of holding bracket 18 welded with the bottom 4. This bracket 18 is additionally provided with supplemental reinforcement angle bracket 19 providing effective anchorage for the lower portion of this closure 14 against shifting relatively to the cabinet.

The upper portion of this plate 14 rests against jamb 20 and is held against outward shifting by bolt 21 of the lock 15, 16, in housing 22 (Fig. 6). Mounted on the plate 14 about this housing 22 are brackets 23 having eyes 24 through which are upwardly thrust V-shaped yoke assembling a pair of bolts 25 by springs 26, one of these connected bolts 25 being on each side of the primary locking bolt 21 of the lock 15. Bolts 27 fixed with the housing 22 mount interception means 28 holding the respective bolts 25 against engagement with the jamb 20. This accordingly provides emergency means effective should attempt be made to drive the lock 15. This emergency lock mechanism is located in the region to respond to but minimum shifting of the lock 15 at the engaging region of such lock with the jamb so that but slight lock displacement at once effects supplemental locking of this closure against access to the portion of this protective receptacle or housing directly below the drawer.

The front of this cabinet or housing above this closure 14 is provided with opening 29 (Fig. 1) which is closed by drawer front 30. This drawer front 30 is provided with lock 31 which may be manually operated to position bolt from such lock housing 32 to throw bolt 33 into engaging position with the jamb 20. This provides a manual locking means for the drawer supplemental to or apart from the emergency or other safety connections herein. This cash drawer front 30 has rearwardly extending therefrom bottom 34 (Fig. 11) and upstanding rear portion 35 with side portions 36 therebetween. This bottom portion 34 has depending flange 37 as weld assembly with the front plate 30. The side walls 36 have side weld assembly flanges 38 (Fig. 5) with this front 30.

There is thus provided a drawer receptacle in which may be inserted removable coin repository, herein shown as a sheet metal unit having forward coin compartments 39 (Fig. 11) and rearwardly therefrom paper money compartments 40. Partition 41 (Fig. 5) is between the coin and paper money compartments. Partitions 42 are between the coin compartments, and partitions 43 are between the paper money compartments. Pivoted arms 44 swing weights 45 to hold the paper money down in the paper money compartments. This main depository unit comprising the coin and paper money receptacles is desirably finished with cloth effect as spray deposited fine felt lining 46.

Anchored with the rear wall 35 is pair of plates 47 positioning helical compression springs 48 as actuating mechanism tending normally to thrust the drawer into nearly open position as the drawer may be released and the pair of springs 48 thrust from pockets 49 due to the compression thereof at drawer closure. These pockets 49 are mounted by brackets 50 having weld assembly with the rear upstanding wall portion 8 of the cabinet. The drawer has at its bottom 34 brackets 51 positioning bar 52 normally engaged at closed position by latch 53. This latch 53 has therethrough pin 54 normally upwardly thrust by helical compression spring 55. This is a supplemental closure holding position for the drawer in the event the lock 31 be not in use to retain this drawer closed against the action of the pair of springs 48. Fixed with each side of the drawer is an overhanging flange 56 (Fig. 10) providing a roller track. The side walls 8 of the cabinet carry bracket devices 57 mounting upper fiber rollers 58 to ride on the upper side of these tracks 56 and fiber lower rollers 59 retained by the flange of the tracks 56 to ride on the lower side of such tracks 56. There is thus provided antifriction mounting for this cash drawer to promote its quiet operation.

These flanges or tracks 56 extend rearwardly in the cabinet from the drawer proper and terminate in hinges 60 (Figs. 5, 11), from which depend buffer arms 61 held against movement toward the rear wall 8 by depending flanges 62. These buffer arms 61, at forward thrust position limiting travel for the drawer, ride against compressible or rubber cushion stops 63 (Figs. 9, 12). Fixed with these cushions 63 and held by bracket 64 are anti-friction balls 65 coacting with the under side of the tracks 66 (Fig. 9), one fixed to each side wall 8 as anti-friction bearing for this rearward extension back of the drawer. In the travel of the drawer to fully opened position, these depending arms 61 cushion the limit throw of the drawer forward or open. The springs 48, in accumulating the drawer re-opening power, provide cushioning and buffer for the drawer in moving to closed position.

In the event it be desired to remove the money receptacle from the drawer, it is only necessary to engage rear overhang 67 (Fig. 11) and lift such out by further engaging the partitions forwardly therefrom. Should there be occasion to remove the drawer from the receptacle or cabinet, this may be effected when the closure 14 is removed by swinging the respective depending arms 61 upward to clear the buffers 63 and thus the drawer is moved into proximity, with the bracket 64 for clearance, for the full removal of the drawer outwardly through the opening 22.

This bracket 64 is normally positioned at the region of the forward extremity of the tracks 66, and is movable. This bracket 64 has central opening 68 (Fig. 13) near which are located screws 69 mounting clutch device. These screws 69 engage flange 70 of sleeve 71, through which extends screw 72 having rotatable mounting in bearing 73 against rear wall 8 of the cabinet.

Engaging in the helical ways or threads 74 of this screw 72 is a pair of diametrically opposed balls 75 as clutch means protruding from these threads 74 into openings 76 in the sleeve 71, thereby providing the driving connection therewith as such balls are retained against outward throw by cylindrical portion 77 from cam 78 extending to larger cylindrical or freeing portion 79. These portions 77, 78, 79, are in a unit carrying pins 80 protruding through openings 81 in the flange 70 to abut collar 82 (Fig. 9) yieldably positioned by helical spring 83 in spacing from groove pulley 84 anchored with the screw 72 adjacent bearing 85 anchored on plate 86 assembled by screws 87 with brackets 88 (Fig. 10) weld assembled with the bottom 4.

Coacting with the pulley 84 is V-belt 89 in the speed reduction drive from minor groove pulley 90 on shaft 91 of motor 92 having bracket 93 (Fig. 10) assembled by bolts 94 with bracket 95 weld assembled with the base 4. This motor 92, in effecting rotation of the screw 72 at the clutched position determined from the contact of the pins 80 with the yieldable collar 82, propels at a predetermined rate. This may be say for closing the drawer in one second's time, starting say with a 1750 R. P. M. motor with a speed reduction of three to one and with one and one-half inch pitch. This actuation is positive, rapid, and quiet, not for pounding impact, and as the stroke or throw is completed, the cam member 77, 78, 79, at its portion 79 strikes bumper 96 (Fig. 9) causing balls 97 (Figs. 13, 15) to be thrust away from guide-way 98 and ride upon cylindrical portion 99, as held thereagainst by springs 100, the compression of which is adjusted by screws 101.

In this shifting to thrust the pins 80 out through the openings 81, the cylindrical portion 77 rides clear of the openings 76 in the sleeve 71 so that the balls 75 may not only ride out on the cam portion 78 but into the enlarged diameter portion 79, thus to unclutch automatically the connection between this bar 64 and the propelling action due to the rotation of this screw shaft 72. During this movement of the bar 64, such has been effective to engage the depending arms 61 if the drawer be opened, or if the drawer be closed, to contact such arms 61 at the limit position rearwardly and thereby effect positive holding to closed position of this safety receptacle with a continuation of this motor operation, notwithstanding it be at the unclutched position, and accordingly against wreckage effectiveness on the unit, for the drawer is so held by the latch 53.

The screws 101 at the springs 100 are in sleeves 102 having threaded assembly with sleeve 103 about sleeve 104. This sleeve 104 has flange 105 engaged by the screws 69 in assembly with the flange 71 for locating this sleeve 104 about the member having cylindrical portion 77 and which carries the pins 80. This sleeve 104 has openings 106 through which the balls 97 may be outwardly thrust by the action of the cam 98. This sleeve 103 is anchored with the sleeve 104 by screws 107 (Fig. 15). The sleeve 103 has overhanging flange 108 determining the outward limit of throw for the clutch operating member 77, 78, 79, by providing stop for shoulder 109 of this member.

From the plate 86 (Fig. 10) there extends at one side bracket 110 providing guide for the bolt or catch 53. Oppositely therefrom this plate 86 has extension 111 which as terminally offset is engaged by bolt 112 anchoring such plate with bracket 113 welded to a side wall 8 remote from the motor 92.

Inwardly from the closure 14 is supplemental partition 114 (Figs. 8, 11) assembled by wing nut 115 with flange 116 (Fig. 9) from the plate 86. This partition 114 has opening therethrough for push button 117 (Figs. 8, 11). This push button 117 is normally thrust outward by helical spring 118. The push button 117 extends to lever 119 having pivotal mounting 120 in bracket 121, having upstanding guide portion 122 for the push button 117 between the lever 119 and the partition 114. This lever 119 is a trigger which, by depressing the push button 117 is thrust clear of pin 123, thereby allowing gravity descent of core 124 in solenoid 125 mounted in bracket 126, connected by screws 127 with upstanding bracket 128 weld assembled with the bracket 121 and bottom 4 of the cabinet.

In setting up this cabinet unit, electrical safeguarding connections are desirably placed as to the supply lines remote from the drawer opening or front end thereof. Supply current, as power circuit 110 volt, 60 cycle A. C., may enter the cabinet by supply lines 129, 130, at fitting 131 (Figs. 1, 2, 7). These lines 129, 130, are to primary 132 of transformer having secondary 133 in which is this solenoid winding or coil 125. This secondary winding may be energized by closing emergency service switch 134 as a push button at one side of this cabinet or safety receptacle. The depressing of this push button 134 energizing the solenoid 125 lifts the core 124 so that the compression helical spring 118 is effective to pull the lever 119 under the catch 123 and hold this core 124 elevated, thus opening switch 135 effective through lines 136, 137, out through fitting 138 in the cabinet to A. D. & T. or other alarm 139. This movement is effective to open switch 140.

This switch 140, as thus opened, precludes normal service operation for functioning of the drawer in use. That is, this switch 140, had the switch 134 not been opened, would be effective to supply current wire 130 by line 141, switch 140, line 142, past normal service switch 143 and line 144 to energize solenoid coil 145 connected to the power line 129. Energizing of this solenoid 145 (Fig. 10) is effective against the action of spring 55 to withdraw the bolt 53 and thereby release the drawer so that the pair of compression helical springs 48 may snap the drawer a portion of the run-way outward from the cabinet so that fully withdrawn position for access as desired may be had. At the release of the push button 143, the coil 145 is de-energized and the spring 55 at once is in thrown position to have its bevel face of the bolt 53 catch the bar 52 as the drawer is manually thrust over the cam face of this bolt to closed position. Whether or not the drawer be open, if this switch 134 be closed for emergency, or any one of the remote control switches 146 be closed, these switches in parallel with the switch 134 are effective in the danger or emergency catch for energizing the coil 125 and not only closing switch 135 for the alarm but opening switch 140 against occasion for operating the bolt 53.

Furthermore, this action of the coil 125 closes switch 147 for current connection from the power supply line 141 to line 148 in operating the motor 92 connected to the power supply line 129. This motor 92 may receive the 110 volt, 60 cycle, A. C. power supply, while the transformer 132, 133, may serve to cut down the voltage to say 25 or other voltage for the coil 125, thereby permitting push button remote wiring to switches 146 about the store, bank or other installation.

In parallel with these remote switches is foot push switch 149 conveniently located in the vicinity of the cash drawer so that the operator, even if hands be thrown up, may timely introduce the protective program for this safety receptacle. This operation of the motor 92, as thus cut in, will continue and in a second's time, through the ball clutch device at the sleeve 71, carries the bar 64 along the screw shaft 72 and thereby through the depending portions 61, pulls the cash drawer into closed position, or if the drawer be initially in closed position, brings this bar 64 to insure to locked position for latch 53 holding the drawer so closed. As the traveling clutch reaches the limit of movement along the screw 72, the sleeve or member 77, 78, 79, is axially thrust reversely of the travel as abutting the buffer 96 and thus allows the balls 75 to move into unclutching relation, notwithstanding the motor drive continues to rotate this shaft 72. This unclutching of the drive does not mean that the drawer is released because pulling of the drawer to this closed position is supplementally held by the bolt 53. Accordingly, there is this power actuator including the rotary screw 72 effective for drawer closing fully.

It thus follows from the disclosure herein that a small merchant, a service station operator, or even in extensive stores with considerable valuables and funds, there is possible in this receptacle device a safeguarding of cash or other valuables for varied ranges of control. The normal absence of the one having access may be one for safeguarding by manual operation of the lock 31. With the drawer released by unlocking at lock 31 the drawer will not open but requires the depression of the push button 143. Forthwith the springs 48 are effective to snap the drawer not to fully thrown position, and accordingly avoids sound or noise from impact. Inasmuch as the rollers 58, 59, are fiber, there is absence of noise in this service operation.

There is likewise purpose for quiet mechanism of control in the emergency to the end that depression of the foot switch 149, the emergency cabinet switch 134, or by a watchman or sentry or other person closing a switch 146, not only quietly operates the solenoid 125, but the motor 92 is a quiet motor and it does not slam the drawer into closed position but it is effective, in the instance the drawer should be in open position at the time of attack or attempted attack, to apply a power which is of forceful effect in bringing rapidly, without impact, the drawer into fully locked position. With this installation thus brought to sealed relation, it is in order that the one on duty is not sufficiently prepared to gain access, but that the proprietor or traveling auditor must be called upon so that the two keys must first be used at the dual lock 15, thereby permitting release of the plate 14 so that the push button 117 may be thrust to allow the core 124 to drop from the de-energized coil 125, thus closing the circuit so the switch 143 may be effective to release the drawer by energizing the coil 145 to withdraw the bolt 53.

Screws 150 mount bracket 151 on the plate 86 to assemble the transformer. Screw mountings in the lower cabinet to the weld assembled parts permit ready removal for repair or replacement of the several devices.

There is positive stop 152 (Fig. 11) in the cabinet limiting movement of the drawer front 30 against crowding back into the cabinet; such point of positive stop being just sufficient to permit ready functioning of the bolt 53.

The thread means 74 on the screw 72 have an effective cam action in the de-clutching due to relative continuous rotation between the shaft 72 and the nut 71 after the sleeve 70, 78, has shifted its enlargement or pocket portion 79 into position. This means that there is nicety for this stop even in addition to a cut-out for the motor 92 as its functioning operation is completed.

What is claimed and it is desired to secure by Letters Patent is:

1. A drawer, a closure cabinet therefor providing a guide, oppositely effective actuating mechanisms anchored in position with the cabinet and independently operable, one for shifting the drawer out from the cabinet, the other for taking the drawer from said open position back into cooperating position for the one again to act, said other mechanism including a motor, a speed reduction drive therefrom, and limit disconnecting means between the drive and the drawer.

2. A drawer, a closure cabinet therefor providing a guide, drawer opening actuating mechanism, and for the drawer as opened, drawer closing mechanism to re-set the drawer to closed position for the opening mechanism again to act, said mechanisms respectively being anchored with the cabinet and independently operable, said closing mechanism including a motor, an actuating screw for the drawer connectable to the motor, a traveling nut for connecting the drawer with the screw, a clutch between the screw and nut, and limit control means for the clutch.

3. A pair of relatively shiftable members, shift-effecting mechanism therebetween embodying an actuating screw longitudinally fixed with one of the members, a nut on the screw having engagement with the other member, a motor for effecting relative rotation between the nut and screw, said nut including ball connection means with the screw to transmit rotation between the nut and screw, said nut including ball connection means with the screw to transmit rotation between the nut and screw axially of the screw, a sleeve reciprocable relatively to the nut and having pocket means for receiving the ball connection means as urged thereinto by progress along the screw as cammed therefrom into the pocket means.

4. A drawer, a closure cabinet therefor providing a guide, oppositely effective actuating mechanisms anchored in position with the cabinet and independently operable, one for shifting the drawer out from the cabinet to open position, and the other for withdrawing the open drawer back into the cabinet into cooperating position for the one again to act, a one thereof including rotatable driving means, transmission connection from the mechanism having said rotatable driving means to shift the drawer to bring said other mechanism into position for subsequent operation, a clutch for the transmission connection, a limit cut-out for the clutch, and a holder for the drawer in closed position independent of said mechanisms.

5. A drawer, a cabinet therefor providing a guide for the drawer in shifting into and out of the cabinet drawer actuating mechanism for causing the drawer to move relatively to the cabinet and on the guide, a switch for said mechanism, and, control means in the cabinet for the drawer in its movement on the guide relatively to the cabinet, said means including a clutch device.

6. A drawer, a cabinet therefor providing a guide for the drawer in shifting into and out of the cabinet, actuating mechanism including a clutch-carrying traveling nut for shifting the drawer on the guide, and a catch device for closed position of the drawer.

7. A drawer, a control cabinet therefor providing a guide, actuating mechanism for the drawer anchored with the cabinet clear of the drawer at drawer closed position, said mechanism comprising a drawer propelling bar, a traveling nut on the bar having connection to the drawer, a rotatable actuator for the nut, a release for the nut from the actuator at retracted position of the drawer, and an anti-friction mounting for the bar in the cabinet.

8. A primary member, a secondary member, one of said members providing a guide for relative movement of the other member, actuating mechanism for shifting one of the members as to the other along said guide, said actuating mechanism including a motor, an actuating screw from one member connectable to the motor, a traveling nut for the screw in engagement with the other member, a clutch between the screw and nut comprising roll means, and limit control means for the clutch coacting to shift the roll means clear of the screw fully into the nut.

9. An actuating screw having pitch-providing thread means, a nut for the screw including a clutch having ball means connection with the screw, de-clutching means for the ball means between the screw and nut embodying a sleeve providing pocket means relatively longitudinally shiftable as to the screw, and relative rotation connecting and disconnecting means embodying a cam movable relatively to the sleeve for determining the location of the ball means in connecting or disconnecting relation as to the pocket means.

10. In a protective installation, a device for emergency positioning against attack, a guide for said positioning, a fixedly mounted rotary-drive-promoting actuator for the device including a helix-carrying shaft, and ball clutch engagement means therewith for relative progress therealong, there being a travel limit cut-out for the shaft and engagement means effecting transmission disconnection at the ball clutch independent of discontinuation of the actuator.

11. In a protective installation, a device for emergency positioning against attack, a guide for said positioning, a rotary drive shaft having a helix therealong, engagement means therewith for relative progress therebetween, and a disconnector for the shaft helix and engagement means at progress limit embodying a cam sleeve and helix engaging roll means controlled for shifting to disconnecting position independently of discontinuing the shaft rotation.

12. In a protective installation, a device for emergency positioning against attack, a guide for said positioning, an axially fixed drive shaft having a helix therealong, an annularly complete nut for traveling along the shaft, and a disconnector for the shaft, helix, and nut embodying roll means shiftable from coacting position with the helix at progress limit position for the nut.

CHARLES F. MEILINK.